United States Patent
Doyle, Jr. et al.

[15] 3,650,728
[45] Mar. 21, 1972

[54] COMBATING PIGWEED IN SUGAR BEET FIELDS

[72] Inventors: William C. Doyle, Jr., Leawood; James L. Ahle, Shawnee, both of Kans.

[73] Assignee: Gulf Research & Development Company, Pittsburgh, Pa.

[22] Filed: Dec. 18, 1969

[21] Appl. No.: 886,402

[52] U.S. Cl. .................................................71/88, 71/111
[51] Int. Cl. ..........................................................A01n 9/22
[58] Field of Search ..............................................71/88, 111

[56] References Cited

UNITED STATES PATENTS 3,551,477  12/1970  Koenig et al. ............................71/111
3,539,333  11/1970  Dubrovin ..................................71/111

FOREIGN PATENTS OR APPLICATIONS 696,906  10/1964  Canada ......................................71/88

Primary Examiner—Lewis Gotts
Assistant Examiner—Catherine L. Mills
Attorney—Richard L. Kelly, Carl A. Cline and Forrest D. Stine

[57] ABSTRACT

Pigweed is combated in sugar beet fields by applying post-emergently to the locus of the pigweed a herbicidally effective amount of a composition comprising one part by weight of methyl 3-(N'-m-tolylcarbamoyl)carbanilate and from one-fourth to two parts by weight of 2-(m-chlorophenyl)-4H-3,1-benzoxazin-4-one.

3 Claims, No Drawings

COMBATING PIGWEED IN SUGAR BEET FIELDS

DESCRIPTION OF INVENTION

Pigweed, as the name is generally applied to a particularly vigorous and troublesome weed, encompasses several species of Amaranthus as well as a variety of natural hybrids and cross-breeds. Individual plants appear to be so varied in their response to environmental stress and to chemical weed control agents that complete control is difficult. Surviving plants soon populate an area with resistant strains of Amaranthus. Good control of a competing weed often results in an overwhelming growth of pigweed, which has suddenly been relieved of competition. Pigweed grows tall, shading out low-standing crop plants, consuming nutrients and reducing yields in almost all cultivated areas of the temperate zones. When pigweed contaminates hay and fodder it is particularly objectional because it is toxic to cattle and other ruminants.

Sugar beets, once a highly subsidized hand-culture crop, are now grown by modern mechanized agricultural techniques. This has been made possible by development of new varieties which produce more easily separated seeds, and by the invention of new agricultural machinery. Sugar beets are actually two crops, grown in different areas, in one place to produce seed and in another to produce the large roots in which sucrose is stored by the plants. Pigweed is a serious problem in the growing of the beets for both seed and sugar. Much of the beet culture is on irrigated arid or semi-arid land in which two pests, Amaranthus and Kochia compete with each other. Both the beet tops and the byproduct beet pulp are fed to cattle. Pigweed is a problem both with respect to reduction of yields and contamination of fodder and silage. Chemical control of Kochia has tended to increase the growth of Amaranthus, with which it competes. Chemical control of both of these weeds is necessary to mechanized beet culture, but is difficult because beets are very sensitive to chemical agents.

We have discovered that a composition comprising one part by weight of methyl 3-(N'-m-tolylcarbamoyl)carbanilate and from one-fourth to two parts (preferably one-half to one part) by weight of 2-(m-chlorophenyl)-4H-3,1-benzoxazin-4-one is usually effective in combating pigweed in sugar beet fields. Neither of these compounds, used alone, is particularly effective in combating pigweed, so the results obtained with the combination are rather surprising. The utility of the combination is assured by the fact that it also controls competing weeds, such as Kochia.

In addition to the two-component active ingredient, the formulations employed in combating pigweed may also contain solvents, surfactants, solid or liquid diluents, stabilizers and other substances which facilitate storage, mixing and uniform application, this being common practice in the art.

SYNTHESIS OF THE HERBICIDES

The N-tolylcarbamylcarbanilate herbicide is available on the market as "betanal," or may be made by published methods. The benzoxazinone herbicide may be made by the method of Bain and Smalley, J. Chem. Soc. (c) 1968 p. 1,593, as illustrated in the following procedure.

To a stirred solution of 76.5 g. (0.56 mole) of anthranilic acid in 1,000 ml. of pyridine at room temperature was added 197 g. (1.12 mole) of m-chlorobenzoyl chloride at a rapid dropwise rate. The temperature rose to 45°–50° and, midway through the addition, a precipitate began forming. After stirring one hour at room temperature the slurry was poured into 1,500 ml. of water and the precipitate was filtered, washed well with water and air dried to give 139 g. (96.5 percent) of 2-(m-chlorophenyl)-4H-3,1-benzoxazin-4-one, m.p. 158°–60°. Crystallization from ethanol gave an analytical sample, m.p. 159°–60b$L$.

USE OF THE HERBICIDES

So as to illustrate clearly the selective phytotoxic properties of the herbicides, a group of controlled greenhouse experiments is described below.

Post Emergent Use

The carbamoylcarbanilate herbicide was obtained in the form of a 16 ⅔ percent active water-emulsifiable liquid concentrate. A 6 percent active water-emulsifiable liquid concentrate of the benzoxazinone herbicide was prepared, employing as solvents 43 percent isophorone, 29 percent mesityl oxide and 10 percent dimethylsulfoxide in addition to 12 percent of commercial emulsifiers, sold for use in pesticide formulations.

The proper quantities of the emulsifiable concentrates were mixed with water to form spray mixtures containing the desired proportions of the two herbicides and the same total spray volume, in each instance.

The species of plants on which each compound was to be tested were planted in 4-inch pots in a greenhouse. Ten to 18 days after the emergence of the plants, one pot of each species for each rate was sprayed with an aqueous dispersion of the active compounds prepared as described above, at the rates shown in the following table and at a spray volume of 40 gallons per acre. Approximately 2 weeks after the spray application the plants were observed and the results rated according to the following schedule:

DEGREE OF HERBICIDAL EFFECT

0 = no effect
1 = slight effect
2 = moderate effect
3 = severe effect
4 = maximum effect
    (all plants died)

| Composition, parts by weight | | Application rate (lb./a.) | Plant species | | | | | | | | | | | | | |
|---|---|---|---|---|---|---|---|---|---|---|---|---|---|---|---|---|
| Carbamoyl-carbanilate | Benz-oxazi-none | | Lambs-quarters | Pig-weed | Kochia | Wild buck-wheat | Morn-ing glory | Wild oats | Wild mus-tard | Saf-flower | Sugar beets | Green foxtail | Barn-yard grass | Yellow fox-tail | Giant fox-tail | Vel-vet leaf |
| 1 | 0 | 2 | 4 | 1 | 4 | 4 | | 1 | 4 | | 0 | 4 | 1 | 3 | 3 | 0 |
| 0 | 1 | 2 | 3 | 1 | 1 | 1 | | 0 | 4 | | 1 | 2 | 0 | 0 | 0 | 1 |
| 1 | ½ | 3 | 4 | 4 | 2 | 4 | 4 | 1 | 4 | | 1 | 4 | 1 | 3 | | 4 |
| 1 | 1 | 2 | 4 | 4 | 4 | 4 | 4 | 1 | 4 | 4 | 2 | 4 | 1 | 3 | | |
| 1 | ½ | 1½ | 4 | 4 | 4 | 4 | | 1 | 4 | | 1 | 4 | 3 | 3 | 3 | 0 |
| 1 | 1 | 1 | 4 | 4 | 3 | 4 | 3 | 1 | 4 | 4 | 1 | 2 | 1 | 2 | | |

It is apparent that neither herbicide used alone at application rates as high as 2 lb. per acre will control pigweed, whereas the combination is effective at total application rates as low as 1 lb. per acre. It will be understood by those skilled in the art that it is desirable to apply at the lowest rate which is feasible in a particular situation, so as to avoid the possibility of contamination of beet tops used as cattle feed. Slight injury to beets is readily tolerated, as this injury is barely detectable and the beets appear to recover fully. By comparison, the losses of beet plants injured by hand weeding may be as high as 15 percent of the stand. If Kochia is also present in the beet fields, it is, of course, desirable to apply sufficient herbicide to control this competing pest. Less than complete control should be avoided by repeating the application, as the surviving weeds may propagate herbicide-resistant strains.

We claim:

1. Combating pigweed in sugar beet fields by applying post-emergently to the locus of the pigweed a herbicidally effective amount of a composition comprising one part by weight of methyl 3-(N'-m-tolylcarbamoyl)carbanilate and from one-fourth to two parts by weight of 2-(m-chlorophenyl)-4H-3,1-benzoxazin-4-one.

2. Combating pigweed in sugar beet fields by applying post-emergently to the locus of the pigweed a herbicidally effective amount of a composition comprising one part by weight of methyl 3-(N'-m-tolycarbamoyl)carbanilate and from one-half to one part by weight of 2-(m-chlorophenyl)-4H-3,1-benzoxazin-4-one.

3. A water-dispersible herbicide concentrate consisting essentially of a herbicidally effective quantity of a mixture of one part by weight of methyl 3-(n'-m-tolylcarbamoyl)carbanilate with from one-half to one part by weight of 2-(m-chlorophenyl)-4H-3,1-benzoxazin-4-one, in combination with an organic solvent and a surface active agent.

* * * * *